July 3, 1951 A. V. BEDFORD 2,559,492

SCANNING CONTROL SYSTEM

Filed Feb. 28, 1948 3 Sheets-Sheet 1

Inventor
Alda V. Bedford

By Olin D. Mitchell

Attorney

July 3, 1951 A. V. BEDFORD 2,559,492

SCANNING CONTROL SYSTEM

Filed Feb. 28, 1948 3 Sheets-Sheet 2

Inventor
Alda V. Bedford

By [signature]
Attorney

July 3, 1951 A. V. BEDFORD 2,559,492

SCANNING CONTROL SYSTEM

Filed Feb. 28, 1948 3 Sheets-Sheet 3

Inventor
Alda V. Bedford

By Olin C. Mitchell

Attorney

Patented July 3, 1951 2,559,492

UNITED STATES PATENT OFFICE 2,559,492

SCANNING CONTROL SYSTEM

Alda V. Bedford, Princeton, N. J., assignor to Radio Corporation of America, a corporation of Delaware Application February 28, 1948, Serial No. 12,091

14 Claims. (Cl. 315—29)

This invention relates to scanning raster position control and more particularly to methods and circuit arrangements for remembering position correction from the start of a line to the start of the next line scanned, and also from the start of a field to the start of the next field scanned.

The transmission of images of finite detail and discontinuous or limited motion by electricity has best been solved by the process of scanning, which consists of moving an exploring element, spot or point over the image to be transmitted in a periodically repeated path covering the total image area. The exploring element generates a signal which indicates the brightness of the image area at the instantaneous position of the exploring point. The signal is then transmitted over the communication channel to the reproducing station where a like spot or point whose brightness is controlled by the signal and whose movement is in synchronism with the exploring point at the transmitting station causes an image to be reproduced.

In order to obtain geometrically accurate and natural proportions in image reproduction, it is necessary that the transmitting and receiving rasters be similar.

According to the U. S. patent to George L. Beers, No. 2,385,563, dated September 25, 1945, the velocity of an exploring point is converted into a frequency which is compared to a standard frequency and the results subsequently used to produce a correction. This change in phase is employed to provide a control potential which may vary in both magnitude and polarity. This control potential may be used in any desired manner, for example, it may be used to maintain synchronism or to control the velocity of an exploring point, such as the end of a moving stylus or the spot produced by an electron beam impinging on a surface which is to be explored. The last named example will be recognized as being of particular value in the television art.

It has become quite familiar to the television art that images in substantially their natural color may be reproduced at a remote location by not only dividing the images into elemental areas and transmitting electrical signals representative of the intensity of the various elemental areas, but by also dividing an image into selected component colors which may be transmitted in separate and independent electrical circuits for utilization at a receiving station.

A more satisfactory method for transmitting images in substantially their natural color has become known as the "simultaneous" method, wherein signals representative of each of the selected component color images are transmitted simultaneously over separate electrical circuits.

It will be appreciated, however, that the superpositioning of component color images must be accomplished to a reasonably high degree of accuracy in order to provide for satisfactory color images at the receiving stations.

It will be appreciated that such a requirement can be met only by employing scanning rasters having a high degree of accuracy.

The co-pending U. S. application of Ray D. Kell, Serial No. 772,978, filed September 9, 1947, and entitled "Scanning System," shows and describes arrangements and methods for improving scanning accuracy and providing precise registration of a plurality of scanning rasters in a vertical direction. According to the U. S. application of R. D. Kell referred to immediately above, the scanning target has a control element or area having a selected edge extending along a scanning line. Circuit arrangements are connected to the elements in such a manner as to derive an electrical indication of the relative position of the point of scansion with regard to the selected edge of the control element. The circuit arrangements then provide a raster positioning signal to furnish accurate registration with other scanning rasters.

The concurrently filed U. S. application of Francis J. Darke, Jr., entitled "Scanning Control System," Serial No. 12,083, filed February 28, 1948, shows and describes methods and arrangements for improving scanning accuracy and establishing improved registration between a plurality of scanning rasters.

According to the co-pending application of Francis J. Darke, Jr., referred to immediately above, an optically registered pattern is associated with each scanning raster. The pattern is scanned to form an alternating voltage whose amplitude is indicative of relative position in a first or vertical direction and whose frequency is indicative of the relative velocity of the exploring point. The alternating voltage is converted into a first control voltage by detection to control the position of the exploring point in the first or vertical direction, while a second control voltage is developed by frequency comparison with a frequency standard to control the velocity of the exploring point. The control of velocity of the exploring point regulates position in a second or horizontal direction.

It must be remembered, however, that all scanning processes are usually a series of discontinuous movements of the exploring point and are somewhat analogous to the movement of our line of sight when reading a printed page. Although the scanning control processes referred to above are well adapted for maintaining accuracy during any continuous scanning movement of an exploring point, or in systems having reasonably accurate scanning, normally the correction information necessary for starting any continuous scanning movement of the exploring point is lost between continuous movements. For example, during the scanning of a single field, which is generally recognized as the scanning over the extent of the image area, the information relative to the correction at the beginning of the scanning of the field is immediately lost, so that the exploring element may not start the scanning of the succeeding field from exactly the same position.

It is also true that if the inaccuracy of scanning should allow the exploring element to deviate from the desired position by a relatively great amount, the necessary correcting information would not be available and proper registration could not be had.

According to this invention, however, there is provided a method and circuit arrangement for remembering the necessary correcting voltage between continuous scanning movements of the exploring point. A condenser is charged with the developed correction voltage at the beginning of any continuous scanning movement, and at the beginning of the next succeeding continuous scanning movement or at the beginning of each succeeding field scanning, the charge in the condenser is employed for position control to accurately position the exploring element.

A primary object of this invention is to improve scanning accuracy.

Another object of this invention is to permit accurate registration of a plurality of independent scanning rasters.

Another object of this invention is to improve the registration of color television images.

Other and incidental objects of the invention will be apparent to those skilled in the art from a reading of the following specification and an inspection of the accompanying drawing in which.

Figure 1:
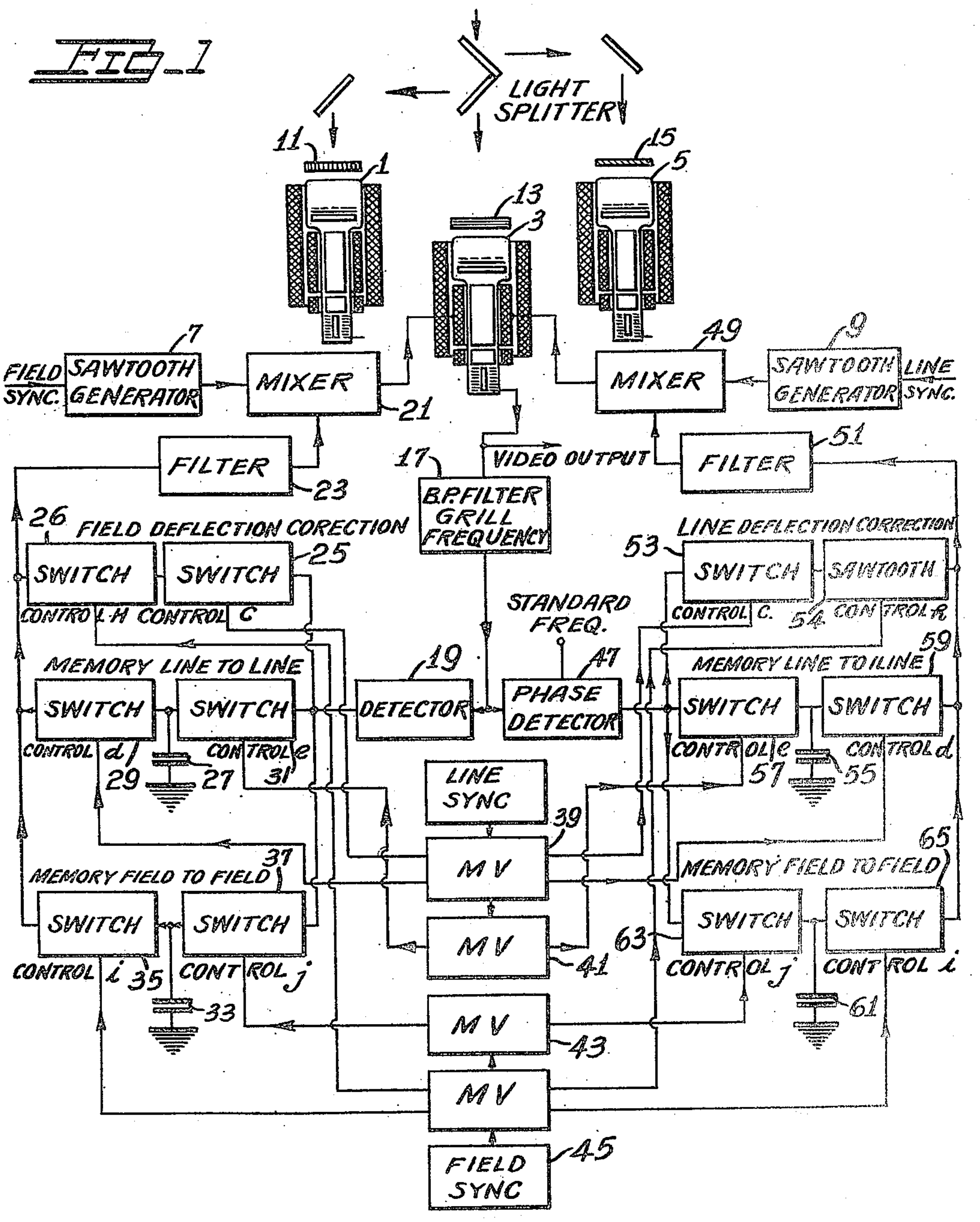
Figure 1 shows by block diagram one form of this invention.

Turning now in more detail to Figure 1, there is shown a color image pickup arrangement comprising three camera tubes 1, 3 and 5 which, for the purpose of illustration, have taken the form of the popular image orthicon type pickup tube which has been well described in the published art, such as, for example, an article entitled "The image orthicon, a sensitive television pickup tube," published in the "Proceedings of the Institute of Radio Engineers" for July 1946. Other types of camera tubes, such as the iconoscope or orthicon, can be employed without departing from the spirit of this invention.

According to the operation of the popular simultaneous type color system employing three camera tubes, each camera tube is responsive to a different selected component color image, such as, for example, the red, green and blue component color images.

In all types of camera tubes, deflection control circuit arrangements are provided for both vertical and horizontal deflection. In the form of the invention shown in Figure 1, a vertical synchronizing signal is applied to the sawtooth wave generator 7. The sawtooth wave is applied to each of the tubes 1, 3 and 5 in the usual manner. For purpose of simplification of the drawing, the sawtooth wave is shown applied to only tube 3. Likewise, a horizontal synchronizing pulse excites sawtooth generator 9 to provide for horizontal deflection of the scanning element or point in tubes 1, 3 and 5.

The horizontal and vertical synchronizing pulse may be obtained in any of the well known forms. Synchronizing signal generators are believed to be sufficiently well known in the television art that no description is needed here.

In the form of the invention shown in Figure 1, the camera tubes 1, 3 and 5 are arranged to convert selected component color images, such as red, blue and green images, into independent signal trains to be transmitted and reproduced at remote locations. Color separation is obtained by color filters 11, 13 and 15 for image pickup tubes 1, 3 and 5, respectively. It will thus be seen, in accordance with the tricolor theory of natural color image reproduction, that each of the tubes 1, 3 and 5 will produce signals representative of a single selected component color image. It will also be appreciated, however, that in order to provide for accurate reproduction of the image, the scanning in the three image tubes 1, 3 and 5 must be controlled to provide not only accurate scanning, but scanning in registry.

In accordance with the aforementioned proposals for the controlling of scanning accuracy, each of the tubes 1, 3 and 5 may be provided with patterns accurately positioned in registry. The patterns are so designed, as described, for example, in the concurrently filed U. S. application of Francis J. Darke, Jr., referred to above, as to generate an auxiliary scanning control voltage having a frequency above the frequency of the desired video signal so that convenient separation from the video signal may be obtained by filter arrangement. The auxiliary signal, which is of a designated "grill" frequency, is separated from the video output signal by band pass filter 17.

Although, for purpose of clarity of explanation and simplification of the drawing, circuit arrangements for only a single tube are illustrated in Figure 1, it is, of course, necessary that the scanning raster of each camera tube be controlled either with a standard or with one of the three. In accordance with one form, each of the image pickup tubes 1, 3 and 5 will have substantially the same control arrangement. In accordance with another form, one of the camera tube scanning rasters will provide a standard control signal with which the other two will be controlled.

In accordance with the detailed explanation given in the concurrently filed application of Francis J. Darke, Jr., referred to above, the amplitude of the signal passing through filter 17 is indicative of the vertical correction required in the scanning, while the frequency or phase deviation of the signal passing through band pass filter 17 is indicative of the horizontal speed correction necessary to be provided to the scanning operation for accurately controlling scanning and accurately controlling the registry of the several scanning rasters. The output of the band pass filter 17 is applied to detector 19, which furnishes control energy to mixer 21 through filter 23. Switches 25 and 26 are provided to pass control energy only during the actual scanning operation and not during the scanning return time.

In accordance with this invention, a portion of the correcting signal obtained from detector 19 is stored in condenser 27 between successive continuous scanning intervals. For the purpose of illustration, we might consider the storing of correction information a "memory line-to-line." That is, the correction necessary to provide for accurate scanning at the beginning of one line is remembered in condenser 27 until the beginning of the next succeeding line. This is accomplished by switching the charge in condenser 27 into the correcting circuit by switch 29 at the beginning of each line.

It is necessary, of course, to properly charge the condenser in each line, and this is accomplished by connecting condenser 27 to detector 19 immediately after the condenser 27 is connected to the control circuit by switch 29. This switching action is provided for by switch 31.

The "memory field-to-field," which is necessary for accurately starting each succeeding field, is provided by appropriately switching condenser 33 into and out of the control circuits by switch 35 and switch 37 in the sequence of operation of switches 29 and 31, but at field frequency.

The control of switches 25, 26, 29, 31, 35 and 37 is effected by multivibrators synchronized by the vertical and horizontal synchronizing signal. Suitable details for multivibrators 39, 41, 43 and 45 are shown by circuit diagram in Figure 3 and will be described below.

Figures 2, 3, 3A, 4:
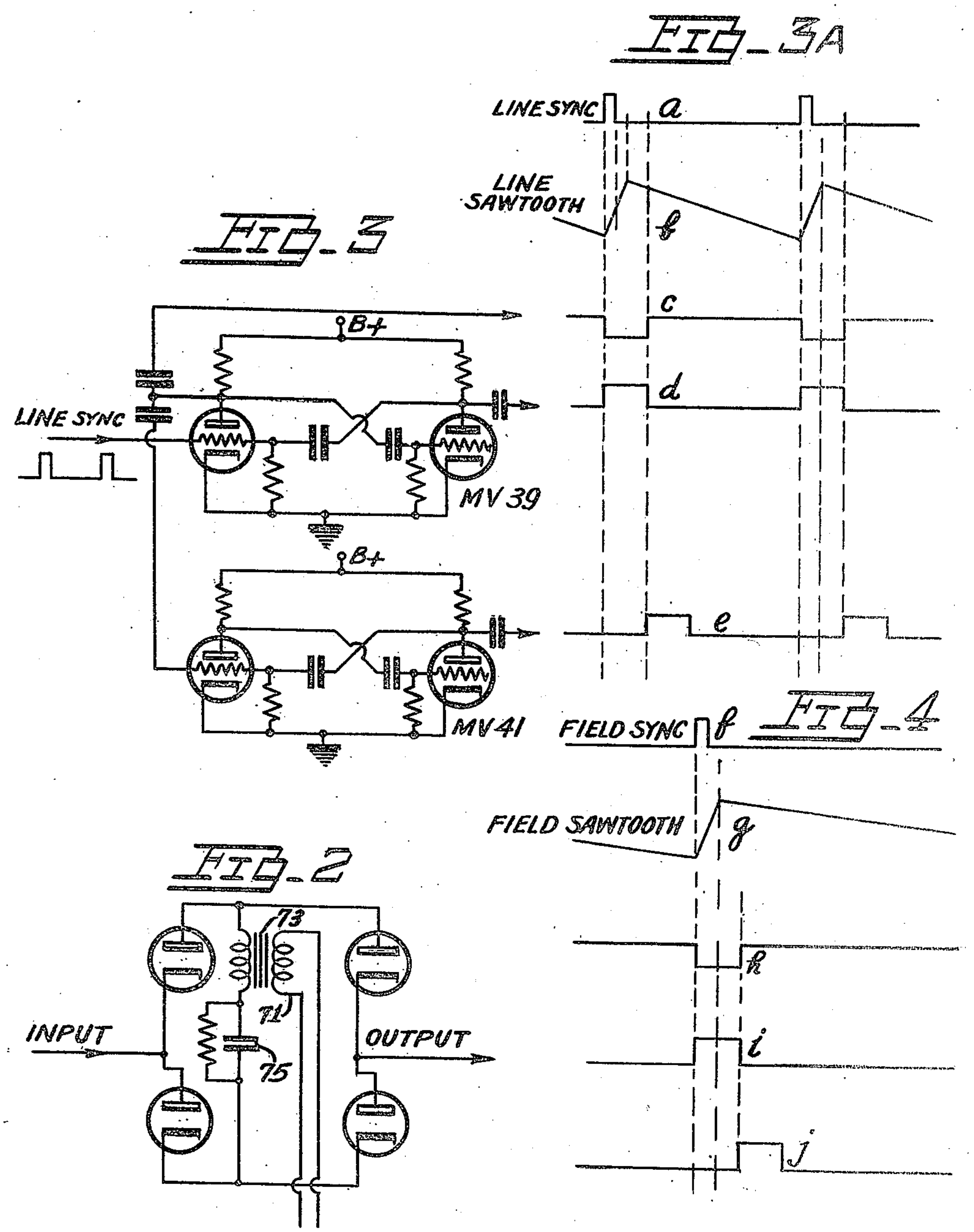
Figure 2 shows by circuit diagram a suitable electronic switch for employment in the practice of this invention.
Figure 3 shows by circuit diagrams suitable multivibrator circuits.
Figure 3A illustrates graphically the operation of the multivibrator circuits shown in Figure 3.
Figure 4 illustrates by circuit diagram additional multivibrator circuits.

The details of the switches employed in Figure 1 are shown in Figure 2.

The arrangement described above provides for vertical deflection correction and vertical memory. In order to provide for full correction, it is also necessary to have a horizontal deflection correction. This is accomplished on the right-hand side of Figure 1, where the signal from band pass filter 17 is passed through phase detector 47. In phase detector 47, the frequency of the signal obtained from band pass filter 17 is compared with the standard frequency to indicate changes in velocity of the scanning point. The changes in control voltage are the result of changes of velocity, which are recognized by phase detector 47, and are combined with the horizontal sawtooth wave obtained from horizontal sawtooth wave generator 9 in mixer 49. The mixer 49 receives the control voltage through filter 51 and switches 53 and 54. Switches 53 and 54 are arranged to provide control voltage only during the scanning operation. Condenser 55 is designated the "memory line-to-line" condenser, and is switched in and out of the circuit at the beginning of each line by switches 57 and 59. Switch 57 connects condenser 55 at the beginning of the line for a short interval and switch 59 charges condenser 55 immediately after switch 57 opens.

The memory field-to-field is provided for by connecting condenser 61 to the control circuit. This is acomplished by operation of switches 63 and 65.

Switches 53, 54, 57, 59, 63 and 65 are also controlled by multivibrators 39, 41, 43 and 45.

The operation of the form of the invention shown in Figure 1 may be more readily understood by reference to the curves of Figures 3A and 4. The curves of Figures 3A and 4 may be considered in connection with the multivibrator circuits shown in Figure 3. The multivibrators shown in Figure 3 are connected through suitable amplifiers (not shown) to control switches of the type shown in Figure 2.

The operation of the switch shown in Figure 2 is well known in the art and operates to connect the input and output circuits when a control voltage in the form of the pulse is applied to the primary 71 of transformer 73. Upon the pulsing of the primary 71 of transformer 73, a potential is added to the circuit to cause the diodes to be biased to conduction. During the time interval that no signal energy or pulse is applied to primary 71 of the transformer 73, a bias potential is maintained across condenser 75, such as to bias the diodes in a manner to cause each of their respective cathodes to be positive with respect to their associated anodes. This presents an open circuit between input and output. When, however, a voltage is induced in transformer 73, the bias potential resulting from the charge on condenser 75 is overcome. This permits conduction between the input and output circuits.

The control voltage for the switch illustrated in Figure 2 is obtained from the multivibrator circuits shown in Figure 3.

Any suitable multivibrator switching arrangement may be employed, and the form of multivibrator illustrated is given by way of example. The operation of the multivibrator shown in Figure 3 is believed to be adequately described in present publications, and needs no further detailed description here. It is, however, important to notice at which point the control voltage is obtained from the respective multivibrator circuits and how the multivibrators are connected to provide for appropriate timing.

In Figure 3, the line synchronizing pulse is applied to the multivibrator 39. The line synchronizing pulse is illustrated in Figure 3A as curve *a*. Curve *b* of Figure 3A illustrates the horizontal sawtooth wave. Curve *c* is obtained from multivibrator 39 and is supplied as indicated "control *c*" in Figure 1. That is, the curves of Figures 3A and 4 correspond to the controls indicated in Figure 1. Multivibrator 39 also supplies curve *d*. Multivibrator 41 obtains its synchronizing energy from multivibrator 39 to provide electrical control in the form illustrated as curve *e*.

Turning now to Figure 4, curve *f* is designated as the field synchronizing pulse. Curve *g* illustrates the field or vertical deflection. Curve *h* illustrates the control obtained from multivibrator 45. Curve *i* illustrates the control energy obtained from multivibrator 43, which is synchronized by multivibrator 45. It will be seen that the curves of Figure 4 are substantially the same as the curves of Figure 3A except that the curves of Figure 3A are at line frequency, while the curves of Figure 4 are at field frequency.

Figure 5:
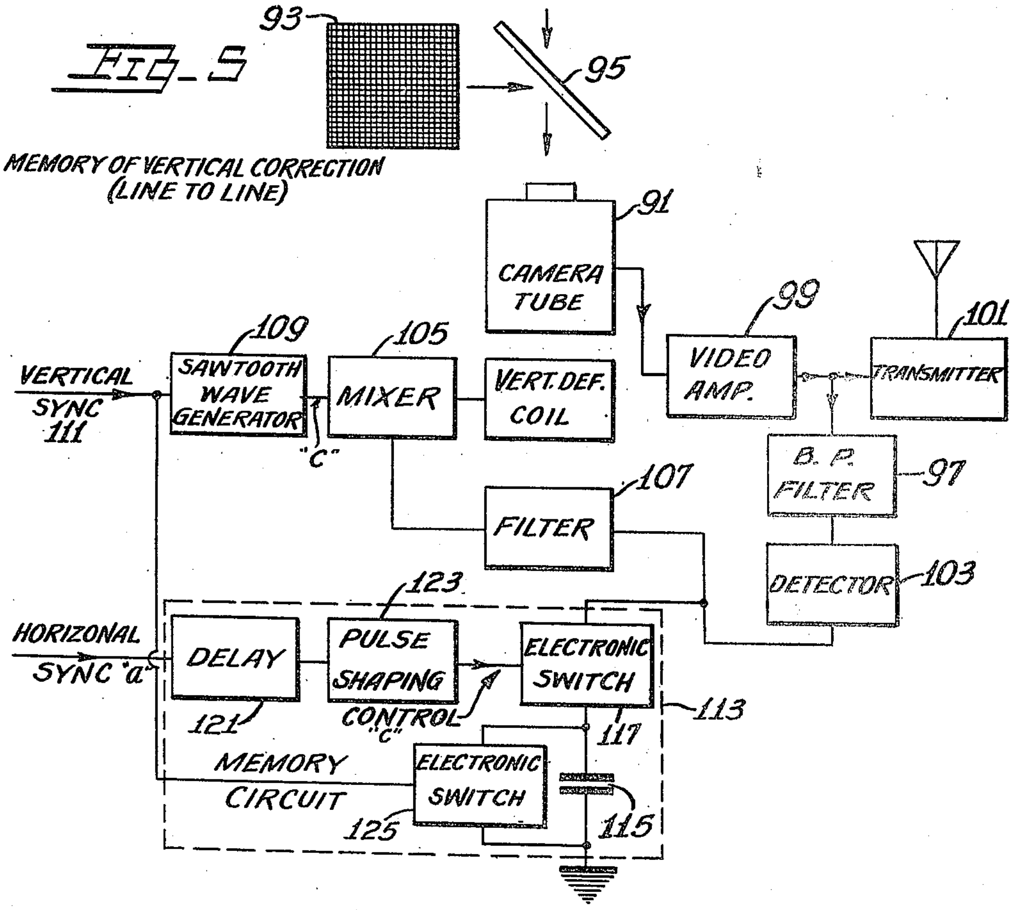
Figure 5 shows by block diagram another form of this invention.

Turning now in detail to Figure 5, there is shown another form of this invention involving a camera tube 91 which receives, in addition to its normal image, an image of a grill 93 through partially reflecting mirror 95. The grill 93 provides the control signal which is passed through band pass filter 97. The image signal on camera tube 91 is amplified in video amplifier 99 and passed to transmitter 101 in the usual manner.

The control signal passed through band pass filter 97 is applied to detector 103. The control voltage obtained from detector 103 is passed to mixer 105 through filter 107. The mixer 105 combines the control signal obtained from detector 103 with the sawtooth wave obtained from sawtooth wave generator 109. The sawtooth wave generator 109 is synchronized in the usual manner by the vertical synchronizing pulse obtained from vertical sync 111.

The memory circuit 113, which is enclosed by a dotted line, includes the memory condenser 115, which is connected into the control circuit during the beginning of each continuous scanning line by electronic switch 117. The electronic switch 117, which may take the form of the circuit diagram shown in Figure 2, is controlled by the horizontal synchronizing pulse. It is necessary, however, to delay this horizontal synchronizing pulse in order that the control of electronic switch is exercised during the beginning of the line scanning, as indicated in curve *c* of Figure 6. This delay is provided in delay block 121, which may take the form of any of the well known delay circuits, such as, for example, the delay lines shown and described in an article entitled "Video delay lines," beginning on page 1580 of the "Proceedings of the Institute of Radio Engineers" for December 1947. The delayed synchronizing pulse is properly shaped in pulse shaping circuit arrangement 123 to control electronic switch 117.

Figure 6:
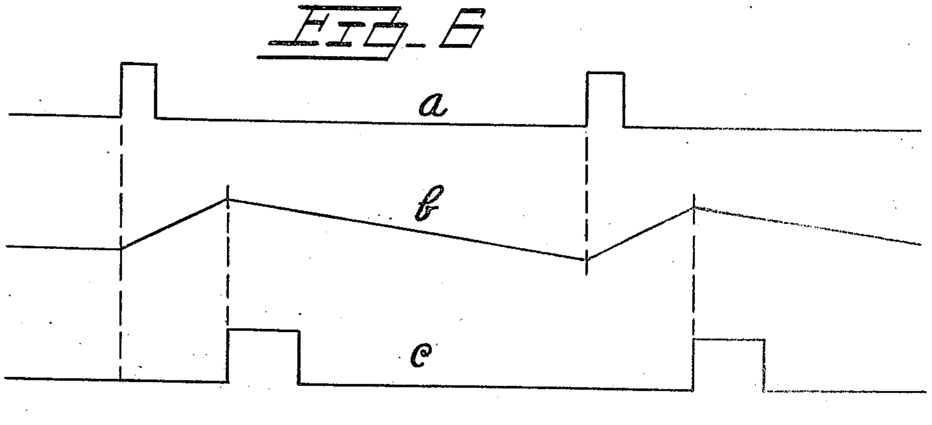
Figure 6 illustrates graphically the operation of the form of the invention shown in Figure 5.

In Figure 6, there is shown a curve illustrating horizontal synchronizing pulses as curve *a*. Curve *b* illustrates the horizontal deflection signal, while curve *c* illustrates the delayed controlling pulse obtained from the pulse shaping circuit 123.

It will be seen that the condenser 115 is then connected in the control circuit during the beginning of each scanning line. Condenser 115 will, by its remembered charge, control the start of the line and will obtain its necessary adjustment by reason of the instantaneous control voltage obtained from detector 103. The control voltage from the detector 103 will also charge the condenser to the adjusted valve, to be used at the start of the next line. It will be seen that in this manner the memory circuit 113 will provide for correction at the beginning of each scanning line.

It is important, however, that the condenser 115 be discharged between field scannings in order that the correction signal at the beginning of the last line of any field will not be repeated at the beginning of the first line of the next succeeding field. This is accomplished by discharging condenser 115 or shorting it out by electronic switch 125. Electronic switch 125 obtains its control energy from the vertical synchronizing pulse.

Although the explanation of this invention was limited to certain forms of control circuits, as referred to above, it is not intended that the practice of this invention be limited thereto. The memory circuit arrangements provided for in the various forms of this invention may be employed with any deflection accuracy control circuit arrangements, whether they be for a single scanning tube or whether they be employed in a multiple system such as that employed in the production of images in substantially their natural color. The explanation of the operation of this invention has also been directed particularly to image pickup devices. It is, of course, important to remember that the practice of this invention may not necessarily be limited thereto, but may be applied with equal advantages to image reproducing systems.

Having thus described the invention, what is claimed is:

1. A system of the type employing an exploring point and having a deflection system arranged to cause said exploring point to repeatedly scan a target in a predetermined scanning raster and a position correcting system to employ with said deflection system, an electrical memory system for controlling the position of said exploring point at the beginning of traverse comprising in combination a capacitive element, a controllable electrical switch arranged to sequentially connect said capacitive element to said deflection system and said position correcting system, and a control circuit for said electrical switch to close said electrical switch only at the beginning of each traverse of said exploring point.

2. In a system of the type employing a scanning agent and having a deflecting voltage system arranged to produce a deflecting voltage to cause said scanning agent to repeatedly scan a target in a predetermined scanning raster and a position correcting voltage system to employ with said deflecting voltage system, an electrical memory system for controlling the position of said scanning agent at the beginning of traverse comprising in combination a capacitive element, a controllable electrical switch arranged to alternately connect said capacitive element to both said deflection system and said position correcting voltage system only during the beginning of a traverse of said scanning agent.

3. A scanning system comprising in combination an exploring agent, a deflecting voltage system arranged to produce a deflecting voltage to cause said exploring agent to repeatedly scan a target in a predetermined scanning raster, a position correcting voltage system to generate a position correcting voltage to employ with said deflecting voltage, and a circuit arrangement for storing deflection correcting voltage from only the beginning of one traverse to the beginning of another traverse.

4. A scanning system comprising in combination an exploring point, a deflecting voltage system arranged to produce a deflecting voltage to cause said exploring point to repeatedly scan a target in a predetermined scanning raster, a position correcting voltage system to generate a position correcting voltage to employ with said deflecting voltage, and a circuit arrangement responsive only during the beginning of each scanning line for storing a correcting voltage from near the beginning of one traverse to the beginning of the next succeeding traverse.

5. A scanning system comprising in combination an exploring agent, a deflecting voltage system arranged to produce a deflecting voltage to cause said exploring agent to repeatedly scan a target in a predetermined scanning raster, a position correcting voltage system to generate a position correcting voltage to employ with said deflecting voltage, and a capacitive circuit arrangement for storing each correcting voltage from only near the beginning of one line traverse to only the beginning of the next succeeding line traverse.

6. A scanning system comprising in combination an exploring agent, a deflecting voltage system arranged to produce a deflecting voltage to cause said exploring agent to repeatedly scan a target in a predetermined scanning raster, a position correcting voltage system to generate a position correcting voltage to employ with said deflecting voltage, and a circuit arrangement for storing correcting voltage from only near the beginning of one field traverse to only the beginning of the next succeeding field traverse.

7. A scanning system comprising in combination an exploring point, a deflecting voltage system aranged to produce a deflecting voltage to cause said exploring point to repeately scan a target in a predetermined scanning raster, a position correcting voltage system to generate a position correcting voltage to employ with said deflecting voltage, a circuit arrangement for storing a first direction correcting voltage from near the beginning of one line traverse to the beginning of the next succeeding line traverse, and a second circuit arrangement for storing a second direction correcting voltage from near the beginning of one field traverse to the beginning of the next succeeding field traverse.

8. A circuit arrangement for obtaining a voltage available for control purposes in a system of the type employing an exploring agent and having a deflecting voltage system arranged to produce a deflecting voltage to cause said exploring agent to repeatedly scan a traget in a predetermined scanning raster and a position correcting voltage system to employ with said deflecting voltage system, a circuit arrangement for remembering, comprising a capacitive element and a switching system arranged to connect said capacitive element to said deflecting voltage system to correct said deflecting voltage, then connect said capacitive element to said position correcting system in sequence and at the beginning only of a traverse of said scanning agent.

9. A circuit arrangement for obtaining a voltage available for control puposes in a system of the type employing an exploring agent and having a vertical deflecting voltage system arranged to produce a vertical deflecting voltage to cause said exploring agent to repeatedly scan a target in a predetermined scanning raster and a vertical position correcting voltage system to employ with said vertical deflecting voltage system, a circuit arrangement for remembering, comprising a capacitive element and a switching system arranged to connect said capacitive element to said vertical deflecting voltage system to correct said vertical deflecting voltage, then connect said capacitive element to said vertical position correcting system in sequence and at the beginning only of a traverse of said scanning agent.

10. A circuit arrangement for obtaining a voltage available for control purposes in a system of the type employing an exploring agent and having a horizontal deflecting voltage system arranged to produce a horizontal deflecting voltage to cause said exploring agent to repeatedly scan a target in a predetermined scanning raster and a horizontal position correcting voltage system to employ with said horizontal deflecting voltage system, a circuit arrangement for remembering, comprising a capacitive element and a switching system arranged to alternately connect said capacitive element to said horizontal deflecting voltage system and to said horizontal position correcting system in sequence and near the beginning only of each traverse of said scanning agent.

11. In the reproduction of images in which an exploring point is deflected to repeatedly scan in a predetermined scanning raster and wherein instantaneous position correcting information is applied to the deflection of said exploring point to cause it to accurately follow a predetermined scanning raster, the method of remembering said instantaneous position correcting information from the beginning of one traverse to a succeeding traverse comprising the steps of storing a voltage representative of said instantaneous position correcting information obtained near the beginning of a traverse and employing said stored voltage for deflection correction at the beginning of the said succeeding traverse.

12. In the reproduction of registered images in which an exploring point is deflected to repeatedly scan in a predetermined scanning raster and wherein instantaneous position correcting information is applied to the deflection of said exploring point to cause it to accurately follow a predetermined scanning raster, the method of remembering said instantaneous position correcting information from the beginning of one continuous traverse to a succeeding continuous traverse comprising the steps of storing a voltage representative of said instantaneous position correcting information obtained near the beginning of a continuous traverse and employing said stored voltage for deflection correction at the beginning of the said succeeding continuous traverse.

13. In the reproduction of registered images in which an exploring point is deflected to repeatedly scan in a predetermined scanning raster and wherein instantaneous position correcting information is applied to the deflection of said exploring point to cause it to accurately follow a predetermined scanning raster, the method of remembering said instantaneous position correcting information from the beginning of one line traverse to a succeeding line traverse comprising the steps of storing a voltage representative of said instantaneous position correcting information obtained near the beginning of a line traverse and employing said stored voltage for deflection correction at the beginning of the said succeeding line traverse.

14. In the reproduction of registered images in which an exploring point is deflected to repeatedly scan in a predetermined scanning raster and wherein instantaneous position correcting information is applied to the deflection of said exploring point to cause it to accurately follow a predetermined scanning raster, the method of remembering said instantaneous position correcting information from the beginning of one field traverse to a succeeding field traverse comprising the steps of storing a voltage representative of said instantaneous position correcting information obtained near the beginning of a field traverse and employing said stored voltage for deflection correction at the beginning of the said succeeding field traverse.

ALDA V. BEDFORD.

REFERENCES CITED

The following references are of record in the file of this patent:

UNITED STATES PATENTS

| Number | Name | Date |
|---|---|---|
| 1,976,400 | Ilberg | Oct. 9, 1934 |
| 2,077,574 | Maloff | Apr. 20, 1937 |
| 2,096,985 | Von Ardenne | Oct. 26, 1937 |
| 2,098,598 | Schroter | Nov. 9, 1937 |
| 2,307,212 | Goldsmith | Jan. 5, 1943 |
| 2,310,671 | Batchelor | Feb. 9, 1943 |
| 2,398,642 | Homrighous | Apr. 16, 1946 |